United States Patent
Kasai et al.

(10) Patent No.: US 8,404,991 B2
(45) Date of Patent: Mar. 26, 2013

(54) WIRE-CUT ELECTRIC DISCHARGE MACHINE HAVING FUNCTION FOR AUTOMATIC SWITCHING BETWEEN FIXED TEMPERATURE CONTROL AND DIFFERENTIAL TEMPERATURE CONTROL

(75) Inventors: Hirotsugu Kasai, Yamanashi (JP); Ryou Nishikawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/215,480

(22) Filed: Aug. 23, 2011

(65) Prior Publication Data

US 2012/0048832 A1 Mar. 1, 2012

(30) Foreign Application Priority Data

Aug. 25, 2010 (JP) ................. 2010-188508

(51) Int. Cl.
*B23H 1/10* (2006.01)
*B23H 7/02* (2006.01)
(52) U.S. Cl. .................... 219/69.14; 210/175
(58) Field of Classification Search ........... 219/69.12, 219/69.14; 700/162; 210/143, 149, 175, 210/174, 172.1
See application file for complete search history.

(56) References Cited

U.S. PATENT DOCUMENTS

| | | | | |
|---|---|---|---|---|
| 4,730,094 A | * | 3/1988 | Aramaki et al. | 219/69.14 |
| 5,175,408 A | * | 12/1992 | Takashima | 219/69.14 |
| 6,008,461 A | * | 12/1999 | Iezawa et al. | 219/69.12 |
| 2007/0175814 A1 | | 8/2007 | Kita et al. | |
| 2007/0278190 A1 | | 12/2007 | Kita et al. | |

FOREIGN PATENT DOCUMENTS

| | | | |
|---|---|---|---|
| JP | 63028514 A1 | | 2/1988 |
| JP | 63144916 A1 | | 6/1988 |
| JP | 7040185 A1 | | 2/1995 |
| JP | 7237085 A1 | | 9/1995 |
| JP | 9-57541 A | * | 3/1997 |
| JP | 2006-130630 A | * | 5/2006 |
| JP | 2007-203408 A | | 8/2007 |
| JP | 2007-319943 A | | 12/2007 |

OTHER PUBLICATIONS

Decision to Grant a Patent for JP2011-173384 mailed Nov. 22, 2011.

* cited by examiner

*Primary Examiner* — Geoffrey S Evans
(74) *Attorney, Agent, or Firm* — Lowe Hauptman Ham & Berner, LLP

(57) ABSTRACT

A wire-cut electric discharge machine has a cooling device for cooling the machining fluid. A controller for controlling the cooling operation of the cooling device controls the machining fluid temperature by automatically switching, depending on the relationship between the ambient temperature of the wire-cut electric discharge machine and the temperature of the machining fluid, between a fixed temperature control mode in which the machining fluid temperature is maintained at a preset value and a differential temperature control mode in which the machining fluid temperature follows the ambient temperature to limit the difference between the machining fluid temperature and the ambient temperature to a preset range.

9 Claims, 5 Drawing Sheets

WIRE-CUT ELECTRIC DISCHARGE MACHINE HAVING FUNCTION FOR AUTOMATIC SWITCHING BETWEEN FIXED TEMPERATURE CONTROL AND DIFFERENTIAL TEMPERATURE CONTROL

RELATED APPLICATIONS

The present application is based on, and claims priority from, Japanese Application Number 2010-188508, filed Aug. 25, 2010, the disclosure of which is hereby incorporated by reference herein in its entirety.

BACKGROUND OF THE INVENTION

1. Field of the Invention

The present invention relates to a wire-cut electric discharge machine having a function for automatic switching between a fixed temperature control mode and a differential temperature control mode.

2. Description of the Related Art

FIG. 5 is a schematic perspective view of a wire-cut electric discharge machine 30.

A predetermined low torque in the instructed direction reverse to the direction in which a wire electrode 20 is drawn out is applied by a torque motor 10 in a feeding section to a wire bobbin 11 having the wire electrode 20 wound therearound. While the wire electrode 20 unreeled from the wire bobbin 11 passes a brake shoe 13, a plurality of guide rollers, and a feed roller 19 driven by a wire electrode feeding motor (not shown), the tension of the wire electrode 20 between the brake shoe 13 and the feed roller 19 is regulated as the brake shoe 13 is driven by a brake motor 12.

After passing the brake shoe 13, the wire electrode 20 passes an upper wire guide 14, lower wire guide 15, and lower guide roller 16, then passes between a pinch roller 18 and the feed roller 19, and is collected into a wire electrode collection box 17. The workpiece to be machined (not shown) is disposed in a machining vessel 2.

In the wire-cut electric discharge machine 30, a voltage is applied across a gap between the wire electrode 20 and the workpiece to generate discharges for machining the workpiece. A machining fluid is provided between the wire electrode 20 and the workpiece for the purposes of insulation between the wire electrode 20 and the workpiece, cooling, and the removal of machining chips produced by the discharges. The temperature of the machining fluid is increased as the machining fluid is heated by the discharges between the wire electrode 20 and the workpiece. The temperature of the machining fluid is also increased by the heat loss from a pump supplying the machining fluid to the machining vessel 2 in which the workpiece is placed.

The increased temperature of the machining fluid thermally expands and deforms the workpiece and the table on which the workpiece is placed, causing the degradation of machining accuracy and the breakage of the wire electrode 20. The wire-cut electric discharge machine 30 is therefore provided with a cooling device for cooling the machining fluid.

The machining fluid in the wire-cut electric discharge machine 30 is cooled by the cooling device in the following two modes:

(1) Differential temperature control mode, in which a difference between the measured ambient temperature of the machine (wire-cut electric discharge machine) and the measured machining fluid temperature is detected and the machining fluid temperature is caused to follow the ambient temperature to limit the temperature difference to a preset range even if the ambient temperature changes, and (2) Fixed temperature control mode, in which the machining fluid temperature is maintained at a preset temperature by the cooling device.

Japanese Patent Application Laid-Open No. 2007-203408 discloses a technique for controlling the temperature of a working fluid treating apparatus depending on the temperature of the machining fluid in the machining vessel in a wire-cut electric discharge machine. Japanese Patent Application Laid-Open No. 2007-319943 discloses a technique for controllably cooling the machining fluid on the basis of the temperature detected by a temperature detecting means that is selected from a plurality of temperature detecting means according to the machining conditions (whether the amount of heat generated by machining is large or small) of the wire-cut electric discharge machine and the target temperature.

With the method (1) above, a problem would arise when the ambient temperature of the machine widely varies, because the machining fluid temperature follows the ambient temperature and may readily cause thermal deformation of the machine due to the variation of ambient temperatures and the variation of machining fluid temperatures and degrade the machining accuracy. With the method (2) above, a problem would arise when the ambient temperature of the machine is substantially higher than the machining fluid temperature and the difference between the ambient temperature and the machining fluid temperature is large, because dew condensation may be formed on outer walls of the machining vessel in the machine, i.e., the wire-cut electric discharge machine.

The technique disclosed by the aforementioned Japanese Patent Application Laid-Open No. 2007-203408 takes into consideration in controlling the machining fluid temperature in the machining vessel neither the relationship (temperature difference) between the machining fluid temperature and the ambient temperature of the machine (wire electric discharge machine), nor prevention against the dew condensation on the machine in controlling the machining fluid temperature.

With the technique disclosed by Japanese Patent Application Laid-Open No. 2007-319943, a problem would arise when the temperatures widely vary between different temperature detection sites in the wire electric discharge machine, because a large temperature difference and thus dew condensation may readily arise when a different temperature detecting means is selected.

SUMMARY OF THE INVENTION

An object of the present invention is to provide a wire-cut electric discharge machine having a function for automatically switching, depending on the ambient temperature of the wire-cut electric discharge machine and the machining fluid temperature, the controlling means for cooling the machining fluid in order to prevent dew condensation from being formed on the wire-cut electric discharge machine when the machining fluid is cooled by a cooling device.

The wire-cut electric discharge machine according to the present invention includes a machining vessel housing therein a discharge machining section for machining a workpiece by electric discharges by use of a wire electrode, a waste water vessel for collecting and storing the machining fluid from the machining vessel, a freshwater vessel for storing the machining fluid from the waste water vessel after the machining fluid is filtered by a filter, a supply line for supplying the machining fluid from the freshwater vessel to upper and lower wire guides, an ambient temperature measuring means for measuring the ambient temperature of the wire-cut electric discharge machine, a machining fluid temperature measuring means for measuring the machining fluid temperature, a cooling device for controlling the temperature of the machining fluid by cooling the machining fluid in the freshwater vessel and supplying the cooled machining fluid to at least one of the machining vessel, waste water vessel, freshwater vessel, and supply line, and a controller for controlling the cooling operation of the cooling device. The controller automatically switches, depending on the relationship between the ambient temperature measured by the ambient temperature measuring means and the machining fluid temperature measured by the machining fluid temperature measuring means, between a fixed temperature control mode, in which the machining fluid temperature is maintained at a preset temperature, and a differential temperature control mode, in which the machining fluid temperature follows the ambient temperature to limit the difference between the machining fluid temperature and the ambient temperature stays to a preset range.

The controller can control the machining fluid temperature in the following four ways:

(1) when the ambient temperature measured by the ambient temperature measuring means is lower than a predetermined temperature, the controller switches the temperature control of machining fluid to the fixed temperature control mode to maintain the machining fluid temperature equal to or higher than the predetermined temperature;

(2) when the ambient temperature measured by the ambient temperature measuring means is higher than the predetermined temperature, the controller switches the temperature control of machining fluid to the differential temperature control mode to maintain the machining fluid temperature higher than the ambient temperature;

(3) when the ambient temperature measured by the ambient temperature measuring means is higher than the machining fluid temperature measured by the machining fluid temperature measuring means and the difference between these temperatures exceeds a predetermined value, the controller switches the temperature control of machining fluid to the differential temperature control mode to maintain the machining fluid higher than the ambient temperature; or (4) when the ambient temperature measured by the ambient temperature measuring means is higher than the machining fluid temperature measured by the machining fluid temperature measuring means and the temperature difference between these temperatures exceeds the predetermined value, the controller continuously controls the machining fluid temperature in the fixed temperature control mode and sets and maintains the machining fluid temperature at a value higher than the ambient temperature.

When the machining fluid temperature set by the controller is lower than the lowest value in the predetermined ambient temperature range or higher than the highest value in the predetermined ambient temperature range, alarm signals are issued for warning of these situations.

The present invention can provide a wire-cut electric discharge machine including a machining fluid cooling device and having a function for automatically switching the controlling means for cooling the machining fluid depending on the ambient temperature of the wire-cut electric discharge machine and the machining fluid temperature to prevent dew condensation on the wire-cut electric discharge machine.

BRIEF DESCRIPTION OF THE DRAWINGS

The aforementioned and other objects and features of the present invention will be apparent from the following description of embodiments with reference to the accompanying drawings, in which.

DETAILED DESCRIPTION OF THE PREFERRED EMBODIMENTS

Figure 1:
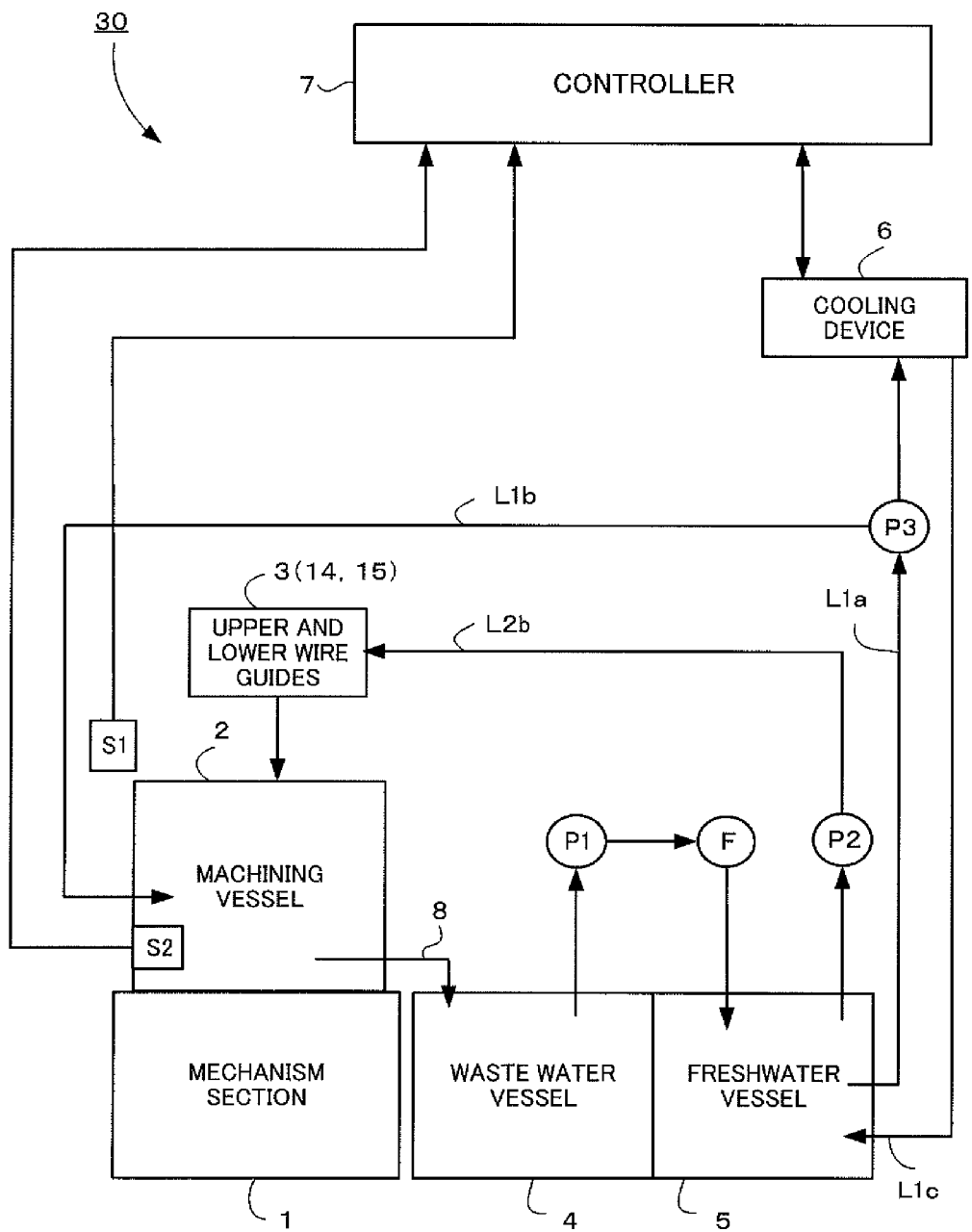
FIG. 1 is a block diagram showing main sections of a wire-cut electric discharge machine having a temperature control function according to the present invention.

FIG. 1 is a block diagram showing main sections of a wire-cut electric discharge machine having a temperature control function according to the present invention.

A machining vessel 2 is provided on a mechanism section 1 of a wire-cut electric discharge machine 30. The machining vessel 2 houses therein a discharge machining section (not shown). A table (not shown) on which the workpiece to be machined is placed is provided in the machining vessel 2. While the workpiece is being moved with respect to a wire electrode 20 (not shown in FIG. 1) by the table driven by a feeding servo motor (not shown) provided in the mechanism section 1, the workpiece is machined by discharges generated by a voltage applied between the workpiece and the wire electrode 20.

A machining fluid is supplied and stored in the machining vessel 2. Because the machining fluid in the machining vessel 2 contains machining chips or the like resulting from the discharges, the machining fluid is caused to flow into a waste water vessel 4 as indicated by arrow 8. The machining fluid collected and stored in the waste water vessel 4 is pumped out by a pump P1 for filtration to remove the machining chips through a filter F, and supplied to a freshwater vessel 5 for storage.

A temperature sensor (machining fluid temperature sensor) S2 in FIG. 1 is provided in the machining vessel 2 to detect the temperature of the machining fluid. It should be noted that the location of the machining fluid temperature sensor S2 is not limited within the machining vessel 2 but may be disposed at any other location at which the machining fluid temperature can be measured, such as a location at which the machining fluid temperature in the freshwater vessel 5 or the temperature of the freshwater vessel 5 itself can be measured, for example, or may be disposed in a machining fluid cooling device 6 to measure the temperature of the machining fluid coming from the freshwater vessel 5.

A temperature sensor (ambient temperature sensor) S1 in FIG. 1 detects the ambient temperature of the machine, i.e., the wire-cut electric discharge machine 30. The ambient temperature sensor S1 is preferably disposed at a location at which the ambient temperature of the wire-cut electric discharge machine 30 can be measured, such as in the vicinity of the machining vessel 2 or at any other site where dew condensation may readily occur in the wire-cut electric discharge machine 30. The ambient temperature of the wire-cut electric discharge machine 30 detected by the ambient temperature sensor S1 is referred to hereinafter as "machine's ambient temperature TR."

The machining fluid in the freshwater vessel 5 is pumped out by a pump P3 for circulation and supplied through a machining fluid supply line L1a to the machining fluid cooling device 6. Receiving a command signal from a controller 7 in the wire-cut electric discharge machine 30, the machining fluid cooling device 6 cools the supplied machining fluid and sends the cooled machining fluid through a machining fluid return line L1c back to the freshwater vessel 5.

The controller 7 controls the cooling operation of the machining fluid cooling device 6 by automatically switching, depending on the machine's ambient temperature TR, between a differential temperature control mode, in which the machining fluid temperature TL follows the machine's ambient temperature TR, and a fixed temperature control mode, in which the machining fluid temperature TL is fixedly maintained at a preset temperature (this preset temperature will be referred to hereinafter as Tset), as described below.

(1) When the machine's ambient temperature TR is lower than the lowest value T1 in the preset machine ambient temperature range, the controller 7 switches the temperature control of machining fluid to the fixed temperature control mode to automatically adjust the machining fluid temperature TL to the preset temperature Tset so as to reduce the temperature variation of the machining fluid and prevent thermal deformation of the machine (wire-cut electric discharge machine 30).

(2) When the machine's ambient temperature TR is higher than the highest value T2 in the preset machine ambient temperature range, the controller 7 automatically switches the machining fluid cooling device 6 to the differential temperature control mode to maintain the machining fluid temperature TL higher than the machine's ambient temperature TR and prevent dew condensation on the machine. The differential temperature control mode in this case also includes setting the machining fluid temperature TL to the same value as the machine's ambient temperature TR.

(3) When the temperature difference between the machine's ambient temperature TR and the machining fluid temperature TL (TR−TL) is greater than a predetermined value ΔT, the controller 7 automatically switches the machining fluid cooling device 6 to the differential temperature control mode to maintain the machining fluid temperature TL higher than the machine's ambient temperature TR and prevent dew condensation on the machine. This differential temperature control mode also includes setting the machining fluid temperature TL to the same value as the machine's ambient temperature TR. It is noted that the predetermined value ΔT is a differential value between the machining fluid temperature TL and the preset temperature Tset.

These automatic switching operations for controllably cooling the machining fluid temperature will now be described in detail with reference to specific examples.

(1) When the machine's ambient temperature TR is lower than 15° C. (an exemplary T1 value) and the machining fluid temperature TL is controlled in the differential temperature control mode, the temperature control of machining fluid is automatically switched to the fixed temperature control mode with the temperature set to 15° C. (Tset←T1). When the machining fluid temperature reaches or exceeds 15° C., the temperature control of machining fluid is switched back to the differential temperature control mode.

(2) When the machine's ambient temperature TR is higher than 30° C. (an exemplary T2 value) and the machining fluid temperature is controlled in the fixed temperature control mode, the temperature control of machining fluid is automatically switched to the differential temperature control mode.

(3) When the machine's ambient temperature TR is in a range of 15° C. to 30° C. and at least 3° C. (an exemplary ΔT value) higher than the machining fluid temperature TL and the machining fluid temperature is controlled in the fixed temperature control mode, the temperature control of machining fluid is automatically switched to the differential temperature control mode. Otherwise (i.e., the machine's ambient temperature TR is not at least 3° C. higher than the machining fluid temperature TL), the machining fluid temperature continues to be controlled in the current temperature control mode (fixed or differential temperature control mode).

It is assumed that the magnitude of the preset temperature Tset satisfies the relationship T1<Tset<T2. Here, T1 and T2 are the lowest and highest values, respectively, in the preset machine ambient temperature range. When Tset deviates from the relationship T1<Tset<T2, an alarm signal is issued. Alarm signals are issued in the following situations:

(a) When the preset machining fluid temperature (preset temperature Tset) is lower than the lowest value T1 in the preset machine ambient temperature range (Tset<T1), an alarm signal is issued to warn that dew condensation may readily occur and adversely affect the machining accuracy. For example, if the preset machining fluid temperature (preset temperature Tset) is 10° C. and the lowest value T1 in the preset machine ambient temperature range is 15° C., i.e., the machining fluid temperature TL is lower than the machine's ambient temperature TR, then an alarm signal is issued warning of this situation.

(b) When the preset machining fluid temperature (preset temperature Tset) is higher than the highest value T2 in the preset machine ambient temperature range (Tset>T2), an alarm signal is issued to warn that the machining accuracy will be affected. For example, when the preset machining fluid temperature is 35° C. and the highest value T2 in the preset machine ambient temperature range is 30° C., i.e., there is a large difference between the machining fluid temperature and the machine's ambient temperature, then an alarm signal is issued warning of this situation.

Figure 2:
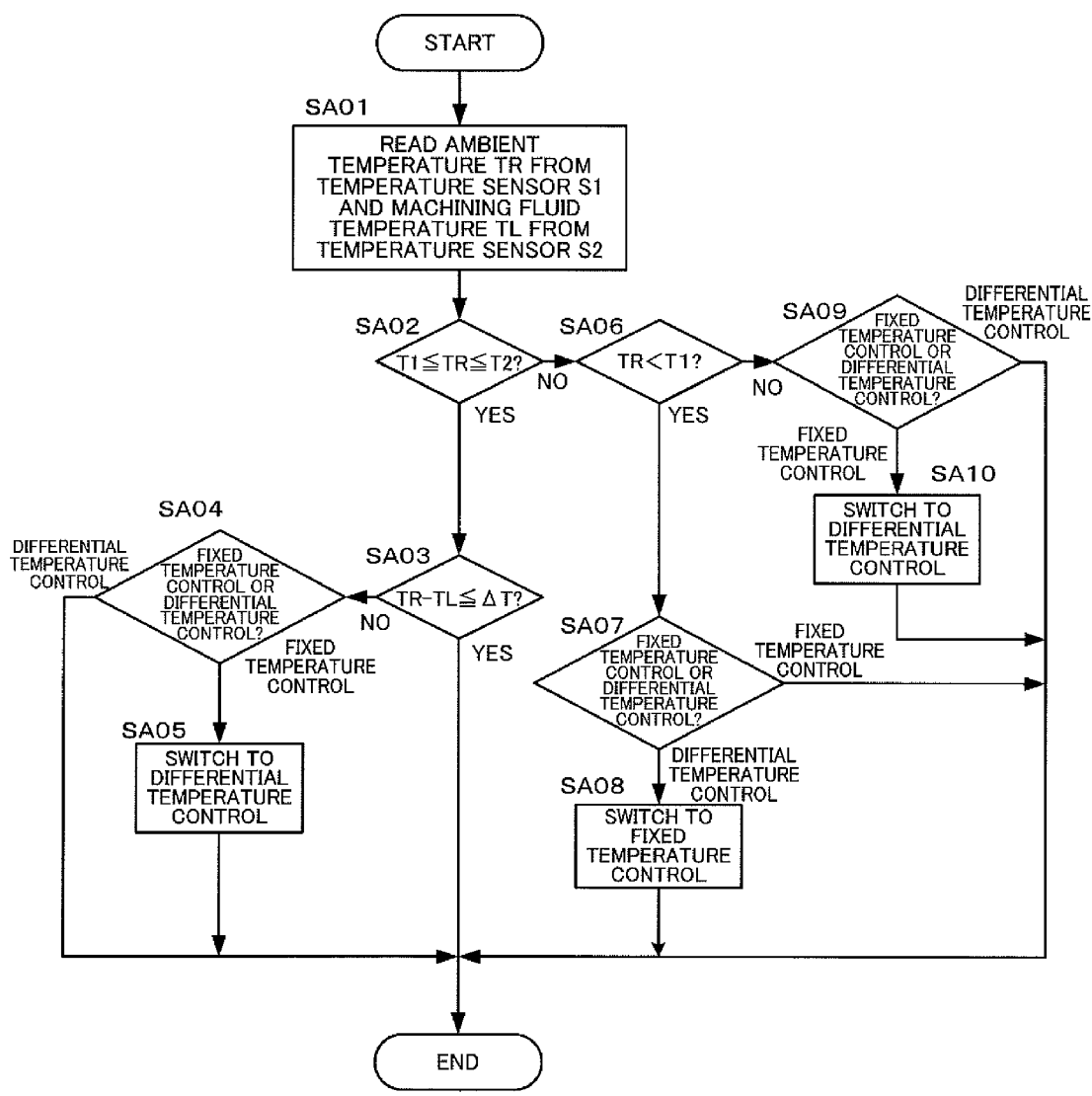
FIG. 2 is a flowchart illustrating a temperature control algorithm according to a first embodiment of the present invention.

FIG. 2 is a flowchart illustrating a temperature control algorithm according to a first embodiment of the present invention. This algorithm will now be described in the order of steps. The process illustrated in this flowchart is repeated for each of the predetermined cycles.

[Step SA01] The machine's ambient temperature is obtained TR from the ambient temperature sensor S1 and the machining fluid temperature TL is obtained from the machining fluid temperature sensor S2.

[Step SA02] It is determined whether or not the ambient temperature TR is equal to or higher than the lowest value T1 in the preset machine ambient temperature range and equal to or lower than the highest value T2 in the preset machine ambient temperature range (i.e., it is determined whether or not the condition T1≦TR≦T2 is satisfied); if the condition T1≦TR≦T2 is satisfied, this process proceeds to step SA03; if the condition is not satisfied, the process proceeds to step SA06.

[Step SA03] It is determined whether or not the value obtained by subtracting the machining fluid temperature TL from the machine's ambient temperature TR is equal to or smaller than the differential value ΔT (=TR−Tset) between the machining fluid temperature TR and the preset temperature Tset (i.e., it is determined whether or not the condition TR−TL≦ΔT is satisfied or not); if the condition TR−TL≦ΔT is satisfied, this process terminates; if the condition is not satisfied, this process proceeds to step SA04.

[Step SA04] It is determined whether the machining fluid temperature is controlled in the fixed temperature control mode or in the differential temperature control mode; if controlled in the differential temperature control mode, this process terminates; if controlled in the fixed temperature control mode, this process proceeds to step SA05.

[Step SA05] The temperature control of machining fluid is switched from the fixed temperature control mode to the differential temperature control mode. This step also includes setting the machining fluid temperature TL to the same value as the machine's ambient temperature TR.

[Step SA06] It is determined whether or not the machine's ambient temperature TR is lower than the lowest value T1 in the preset machine ambient temperature range; if lower (i.e., TR<T1), this process proceeds to step SA07; if not lower (i.e., the machine's ambient temperature TR is higher than the highest value T2 in the preset machine ambient temperature range (TR>T2)), this process proceeds to step SA09.

[Step SA07] It is determined whether the machining fluid temperature is controlled in the fixed temperature control mode or in the differential temperature control mode; if controlled in the differential temperature control mode, this process proceeds to step SA08; if controlled in the fixed temperature control mode, this process terminates.

[Step SA08] The temperature control of machining fluid is switched from the differential temperature control mode to the fixed temperature control mode and then this process terminates.

[Step SA09] It is determined whether the machining fluid temperature is controlled in the fixed temperature control mode or in the differential temperature control mode; if controlled in the fixed temperature control mode, this process proceeds to step SA10; if controlled in the differential temperature control mode, this process terminates.

[Step SA10] The temperature control of machining fluid is switched from the fixed temperature control mode to the differential temperature control mode and then this process terminates. This step also includes setting the machining fluid temperature TL to the same value as the machine's ambient temperature TR.

Determination in steps SA04, SA07 and SA09 as to whether the machining fluid temperature is controlled in the fixed temperature control mode or in the differential temperature control mode can be carried out by identifying the operation state in the differential temperature control mode or the fixed temperature control mode in steps SA05, SA08 and SA10 by means of a flag.

Figure 3:
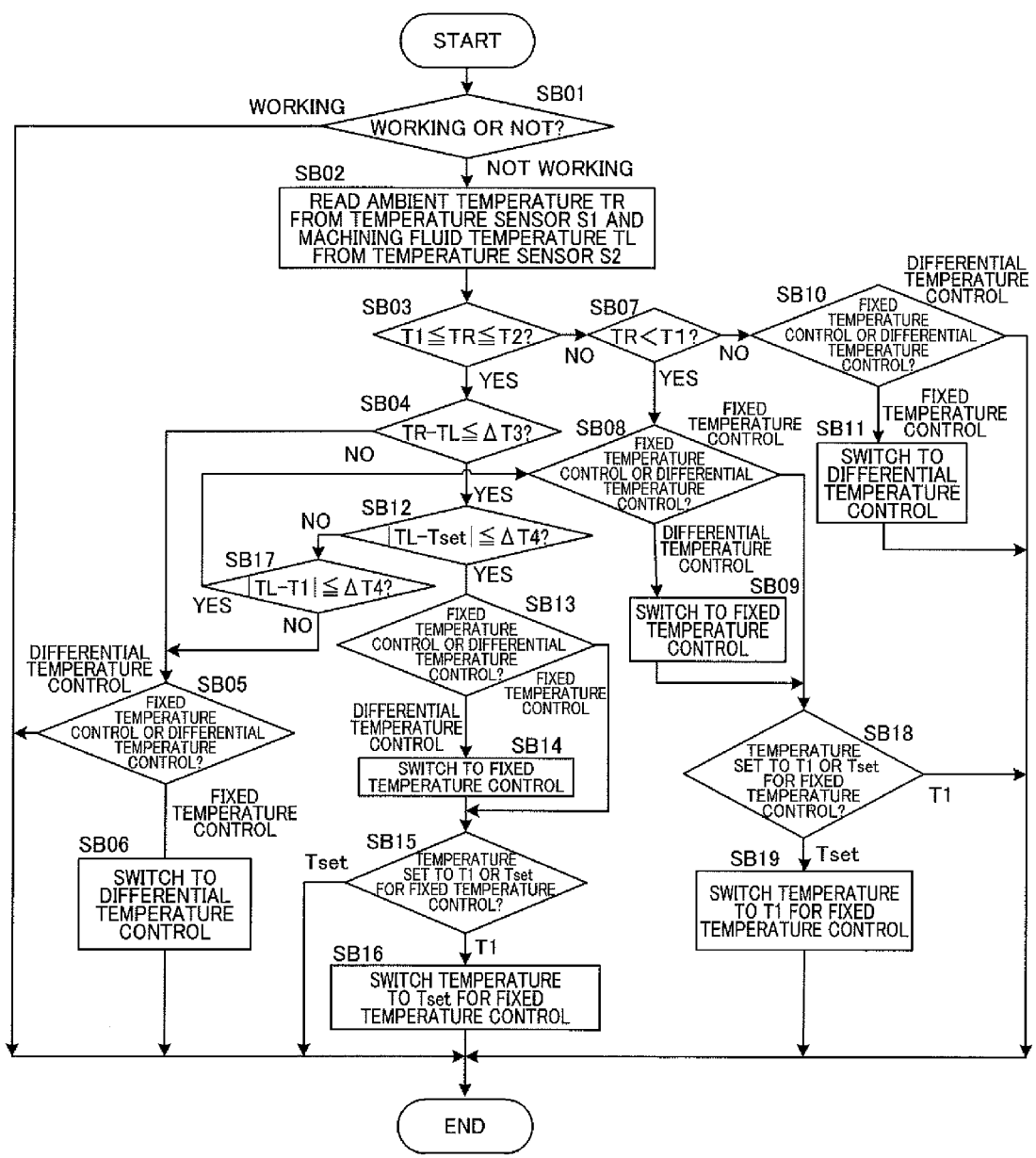
FIG. 3 is a flowchart illustrating a temperature control algorithm according to a second embodiment of the present invention.

FIG. 3 is a flowchart illustrating a temperature control algorithm according to a second embodiment of the present invention. The temperature control according to this embodiment is different from the temperature control according to the first embodiment in FIG. 2 in that it is first determined whether the machine is working or not and the temperature is controlled while the machine is not working. This algorithm will now be described in the order of steps. The process illustrated in this flowchart is repeated for each of the predetermined cycles.

[Step SB01] It is determined whether or not the machine is working. When the machine is working, this process terminates; if not working, this process proceeds to step SB02.

[Step SB02] The machine's ambient temperature TR is obtained from the ambient temperature sensor S1 and the machining fluid temperature TL is obtained from the machining fluid temperature sensor S2.

[Step SB03] It is determined whether the ambient temperature TR is equal to or higher than the lowest value T1 in the preset machine ambient temperature range and equal to or lower than the highest value T2 in the preset machine ambient temperature range (i.e., it is determined whether or not the condition $T1 \leq TR \leq T2$ is satisfied); if the condition $T1 \leq TR \leq T2$ is satisfied, this process proceeds to step SB04; if the condition is not satisfied, this process proceeds to step SB07.

[Step SB04] It is determined whether or not the value obtained by subtracting the machining fluid temperature TL from the machine's ambient temperature TR is equal to or smaller than the differential value $\Delta T3$ (=TR−Tset) between the machining fluid temperature TR and the preset temperature Tset (i.e., determine whether or not the condition TR−TL$\leq \Delta T3$ is satisfied); if the condition TR−TL$\leq \Delta T3$ is satisfied, this process proceeds to step SB12; if the condition is not satisfied, this process proceeds to step SB05.

[Step SB05] It is determined whether the machining fluid temperature is controlled in the fixed temperature control mode or in the differential temperature control mode; if controlled in differential temperature control, this process terminates; if controlled in the fixed temperature control mode, this process proceeds to step SB06.

[Step SB06] The temperature control of machining fluid is switched from the fixed temperature control mode to the differential temperature control mode. This step also includes setting the machining fluid temperature TL to the same value as the machine's ambient temperature TR.

[Step SB07] It is determined whether the machine's ambient temperature TR is lower than the lowest value T1 in the preset machine ambient temperature range; if lower (i.e., TR<T1), this process proceeds to step SB08; if not lower (i.e., the machine's ambient temperature TR is higher than the highest value T2 in the preset machine ambient temperature range (TR>T2)), this process proceeds to step SB10.

[Step SB08] It is determined whether the machining fluid temperature is controlled in the fixed temperature control mode or in the differential temperature control mode; if controlled in the differential temperature control mode, this process proceeds to step SB09; if controlled in the fixed temperature control mode, this process proceeds to step SB18.

[Step SB09] The temperature control of machining fluid is switched from the differential temperature control mode to the fixed temperature control mode and then this process proceeds to step SB18.

[Step SB10] It is determined whether the machining fluid temperature is controlled in the fixed temperature control mode or in the differential temperature control mode; if controlled in the fixed temperature control mode, this process proceeds to step SB11; if controlled in the differential temperature control mode, this process terminates.

[Step SB11] The temperature control of machining fluid is switched from the fixed temperature control mode to the differential temperature control mode and then this process terminates. This step also includes setting the machining fluid temperature TL to the same value as the machine's ambient temperature TR.

[Step SB12] It is determined whether the absolute value of the value obtained by subtracting the preset temperature Tset from the machine's machining fluid temperature TL is equal to or smaller than the preset tolerance $\Delta T4$ (i.e., it is determined whether or not the condition |TL−Tset|$\leq \Delta T4$ is satisfied); if the condition |TL−Tset|$\leq \Delta T4$ is satisfied, this process proceeds to step SB13; if the condition is not satisfied, this process proceeds to step SB17.

[Step SB13] It is determined whether the machining fluid temperature is controlled in the fixed temperature control mode or in the differential temperature control mode; if controlled in the differential temperature control mode, this process proceeds to step SB14; if controlled in the fixed temperature control mode, this process proceeds to step SB15.

[Step SB14] The temperature control of machining fluid is switched from the differential temperature control mode to the fixed temperature control mode and then this process proceeds to step SB15.

[Step SB15] It is determined whether the temperature set for the fixed temperature control mode is the lowest value T1 in the preset machine ambient temperature range or the preset temperature Tset; if T1, this process proceeds to step SB16; if Tset, this process terminates.

[Step SB16] The temperature set for the fixed temperature control mode is switched to Tset and then this process terminates.

[Step SB17] It is determined whether or not the value obtained by subtracting the lowest value T1 in the preset machine ambient temperature range from the machining fluid temperature TL is equal to or lower than the tolerance ΔT4 (i.e., it is determined whether or not the condition |TL−T1|≦ΔT4 is satisfied); if the condition |TL−T1|≦ΔT4 is satisfied, this process proceeds to step SB08; if the condition is not satisfied, this process proceeds to step SB05.

[Step SB18] It is determined whether the temperature set for the fixed temperature control mode is the lowest value T1 in the preset machine ambient temperature range or the preset temperature Tset; if Tset, this process proceeds to step SB19; if T1, this process terminates.

[Step SB19] The temperature set for the fixed temperature control mode is switched to T1 and then this process terminates.

Determination in steps SB05, SB08 and SB10 as to whether the machining fluid temperature is controlled in the fixed temperature control mode or in the differential temperature control mode can be carried out by identifying the operation state in the differential temperature control mode or the fixed temperature control mode in steps SB06, SB09 and SB11 by means of a flag.

Figure 4:
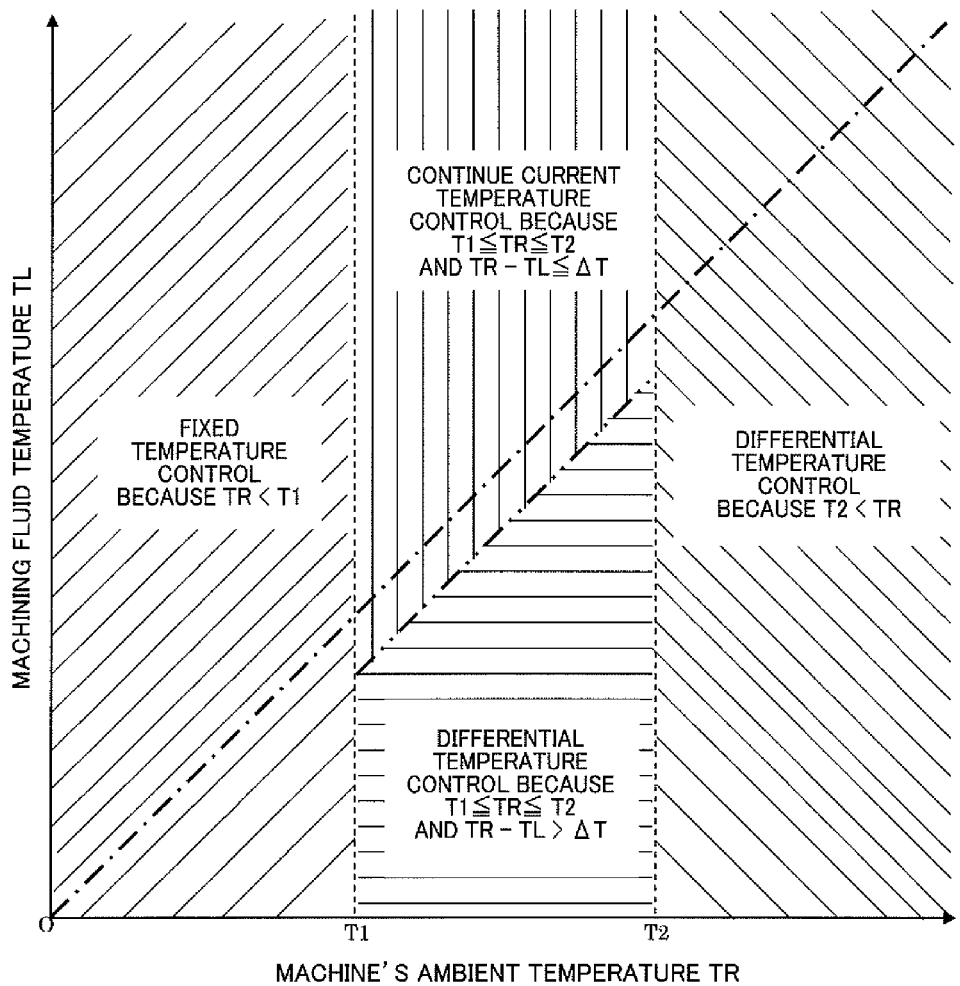
FIG. 4 illustrates the relationship between the temperature of the machining fluid and the ambient temperature of the machine.
Figure 5:
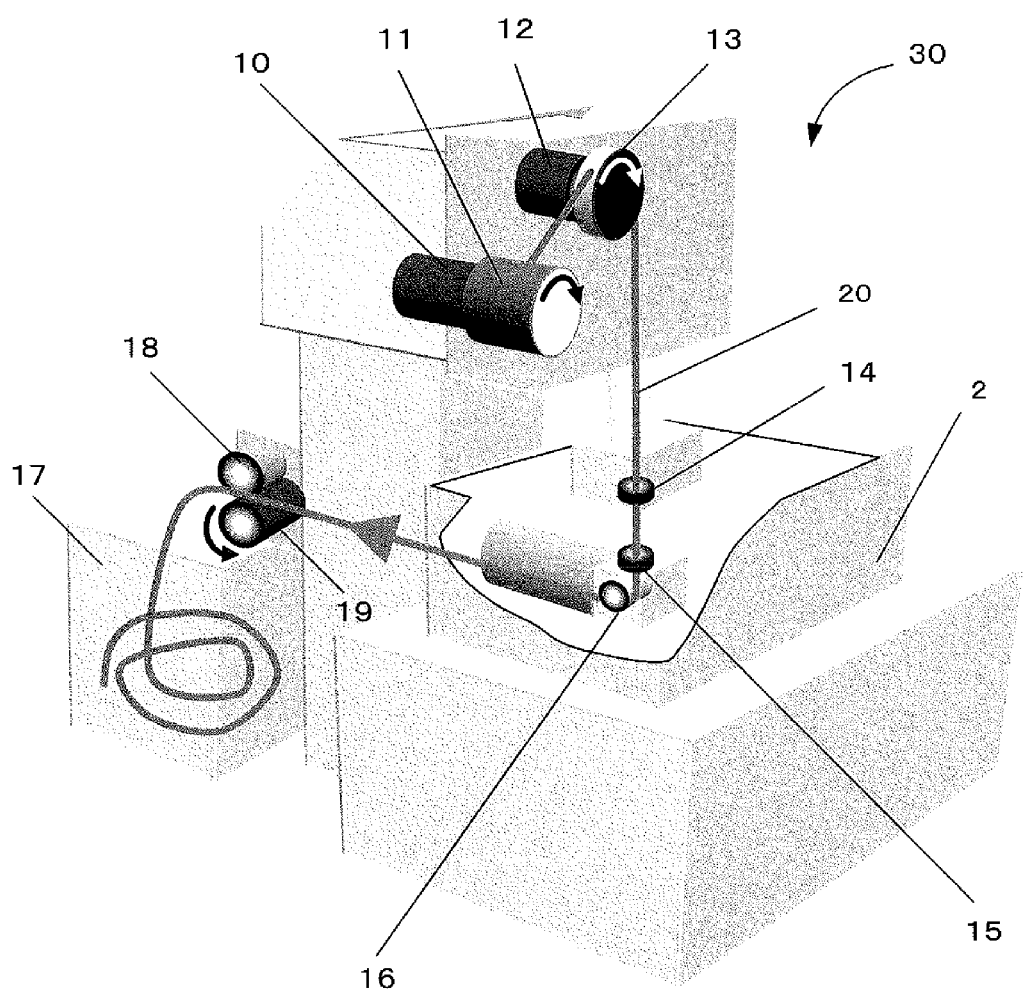
FIG. 5 illustrates mechanical sections composing a wire-cut electric discharge machine.

FIG. 4 illustrates the relationship between the machining fluid temperature and the machine's ambient temperature. The dashed-dotted line represents the line where the machining fluid temperature TL is equal to the machine's ambient temperature TR (line where TL=TR), while the dashed-two dotted line represents the line where the machining fluid temperature TL is equal to the value obtained by subtracting ΔT from the machine's ambient temperature TR (line where TL=TR−ΔT).

(I) When the machine's ambient temperature TR is in the range of 0° C. to T1° C., i.e., TR<T1, the temperature control of machining fluid is switched to the fixed temperature control mode (see steps SA07 and SA08 in FIG. 2 and steps SB08 and SB09 in FIG. 3).

(II) When the machine's ambient temperature TR is in the range of T1° C. to T2° C.:
  (a) if the relationship between the machine's ambient temperature TR and the machining fluid temperature TL is below the dashed-two dotted line, i.e., T1≦TR≦T2 and TR−TL>ΔT, the temperature control of machining fluid is switched to the differential temperature control mode or TL is set to the same value as TR (see steps SA04 and SA05 in FIG. 2 and steps SB05 and SB06 in FIG. 3), or
  (b) if the relationship between the machine's ambient temperature TR and the machining fluid temperature TL is above the dashed-two dotted line, i.e., T1≦TR≦T2 and TR−TL≦ΔT, the machining fluid temperature TL continues to be controlled in the current temperature control mode (YES in step SA03 in FIG. 2 and YES in step SB04 in FIG. 3).

(III) When the machine's ambient temperature TR is higher than T2, i.e., T2<TR, the temperature control of machining fluid is switched to the differential temperature control mode or TL is set to the same value as TR (see steps SA09 and SA10 in FIG. 2 and steps SB10 and SB11 in FIG. 3).

The invention claimed is:

1. A wire-cut electric discharge machine, comprising:
  a machining vessel having a discharge machining section placed therein for machining a workpiece by electric discharges using a wire electrode;
  a first fluid vessel for collecting and storing a machining fluid from the machining vessel;
  a second fluid vessel for storing the machining fluid from the first fluid vessel after filtering the machining fluid with a filter;
  a supply line for supplying the machining fluid from the second fluid vessel to upper and lower wire guides;
  a first temperature sensor configured to measure an ambient temperature of the wire-cut electric discharge machine;
  a second temperature sensor configured to measure a temperature of the machining fluid;
  a cooling device for controlling the temperature of the machining fluid by cooling the machining fluid in the second fluid vessel and supplying the cooled machining fluid to at least one of the machining vessel, the first fluid vessel, the second fluid vessel, or the supply line; and
  a controller for controlling the cooling operation of the cooling device to control the temperature of the machining fluid, wherein
  the controller is configured to automatically switch, depending on a relationship between the ambient temperature measured by the first temperature sensor and the temperature of the machining fluid measured by the second temperature sensor, between a constant temperature control mode for maintaining the temperature of the machining fluid at a preset value and a differential temperature control mode for causing the temperature of the machining fluid to follow the ambient temperature such that a difference between the temperature of the machining fluid and the ambient temperature falls within a preset range,
  when the ambient temperature measured by the first temperature sensor is lower than a predetermined temperature, the controller is configured to control the temperature of the machining fluid in the constant temperature control mode so as to be maintained equal to or higher than the predetermined temperature, and
  when the ambient temperature measured by the first temperature sensor is higher than the predetermined temperature, the controller is configured to control the temperature of the machining fluid in the differential temperature control mode so as to be maintained higher than the ambient temperature.

2. The wire-cut electric discharge machine according to claim 1, wherein the controller is configured to issue an alarm signal when the temperature of the machining fluid controlled by the controller is lower than a lowest value in a predetermined ambient temperature range.

3. The wire-cut electric discharge machine according to claim 1, wherein the controller is configured to issue an alarm signal when the temperature of the machining fluid controlled by the controller is higher than a highest value in a predetermined ambient temperature range.

4. A wire-cut electric discharge machine, comprising:
  a machining vessel including therein a discharge machining section configured to perform a machining on a workpiece by electric discharges using a wire electrode;

a first fluid vessel for collecting and storing a machining fluid from the machining vessel;

a second fluid vessel for storing the machining fluid from the first fluid vessel after filtering the machining fluid with a filter;

a supply line for supplying the machining fluid from the second fluid vessel to upper and lower wire guides;

a first temperature sensor configured to measure an ambient temperature of the wire-cut electric discharge machine;

a second temperature sensor configured to measure a temperature of the machining fluid;

a cooling device configured to control the temperature of the machining fluid by cooling the machining fluid in the second fluid vessel and supply the cooled machining fluid to at least one of the machining vessel, the first fluid vessel, the second fluid vessel, or the supply line; and a controller configured to control the cooling operation of the cooling device to control the temperature of the machining fluid, wherein the controller is configured to automatically switch, depending on a relationship between the ambient temperature measured by the first temperature sensor and the temperature of the machining fluid measured by the second temperature sensor, between a constant temperature control mode for maintaining the temperature of the machining fluid at a preset value and a differential temperature control mode for causing the temperature of the machining fluid to follow the ambient temperature such that a difference between the temperature of the machining fluid and the ambient temperature falls within a preset range, and when the ambient temperature measured by the first temperature sensor is higher than the temperature of the machining fluid measured by the second temperature sensor and the difference exceeds a predetermined value, the controller is configured to control the temperature of the machining fluid in the differential temperature control mode so as to be maintained higher than the ambient temperature.

5. The wire-cut electric discharge machine according to claim 4, wherein the controller is configured to issue an alarm signal when the temperature of the machining fluid controlled by the controller is lower than a lowest value in a predetermined ambient temperature range.

6. The wire-cut electric discharge machine according to claim 4, wherein the controller is configured to issue an alarm signal when the temperature of the machining fluid controlled by the controller is higher than a highest value in a predetermined ambient temperature range.

7. A wire-cut electric discharge machine, comprising:

a machining vessel including therein a discharge machining section configured to perform a machining on a workpiece by electric discharges using a wire electrode;

a first fluid vessel for collecting and storing a machining fluid from the machining vessel;

a second fluid vessel for storing the machining fluid from the first fluid vessel after filtering the machining fluid with a filter;

a supply line for supplying the machining fluid from the second fluid vessel to upper and lower wire guides;

a first temperature sensor configured to measure an ambient temperature of the wire-cut electric discharge machine;

a second temperature sensor configured to measure a temperature of the machining fluid;

a cooling device configured to control the temperature of the machining fluid by cooling the machining fluid in the second fluid vessel and supply the cooled machining fluid to at least one of the machining vessel, the first fluid vessel, the second fluid vessel, or the supply line; and a controller configured to control the cooling operation of the cooling device to control the temperature of the machining fluid, wherein the controller is configured to automatically switch, depending on a relationship between the ambient temperature measured by the first temperature sensor and the temperature of the machining fluid measured by the second temperature sensor, between a constant temperature control mode for maintaining the temperature of the machining fluid at a preset value and a differential temperature control mode for causing the temperature of the machining fluid to follow the ambient temperature such that a difference between the temperature of the machining fluid and the ambient temperature falls within a preset range, and when the ambient temperature measured by the first temperature sensor is higher than the temperature of the machining fluid measured by the second temperature sensor and the difference exceeds a predetermined value, the controller is configured to control the temperature of the machining fluid in the constant temperature control mode so as to be set and maintained at a value higher than the ambient temperature.

8. The wire-cut electric discharge machine according to claim 7, wherein the controller is configured to issue an alarm signal when the temperature of the machining fluid controlled by the controller is lower than a lowest value in a predetermined ambient temperature range.

9. The wire-cut electric discharge machine according to claim 7, wherein the controller is configured to issue an alarm signal when the temperature of the machining fluid controlled by the controller is higher than a highest value in a predetermined ambient temperature range.

* * * * *